Sept. 8, 1959  C. R. DAVENPORT ET AL  2,903,035
BARREL NUT RETAINER HAVING FLEXIBLE RESILIENT OVERLYING WEB
Filed April 15, 1955  2 Sheets-Sheet 1
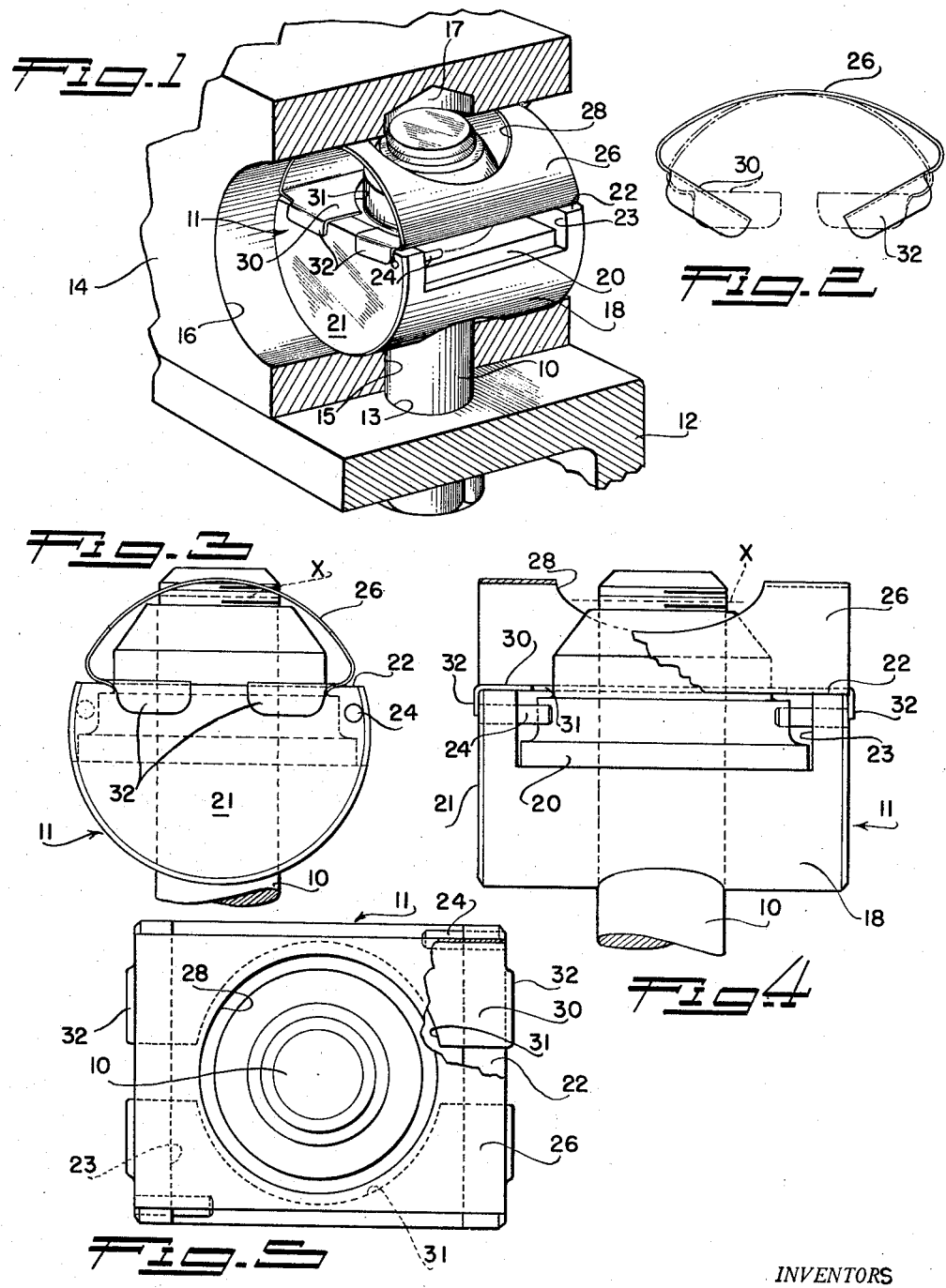
INVENTORS
CARLTON R. DAVENPORT
JUSTI L. MITTLER
By George C. Sullivan
Agent Sept. 8, 1959  C. R. DAVENPORT ET AL  2,903,035
BARREL NUT RETAINER HAVING FLEXIBLE RESILIENT OVERLYING WEB
Filed April 15, 1955  2 Sheets-Sheet 2
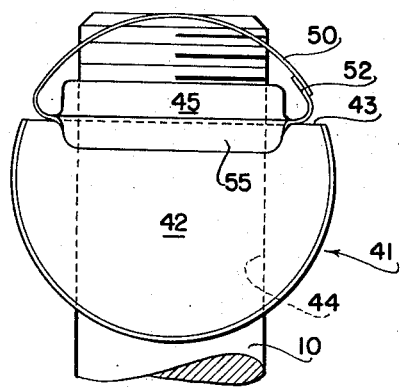
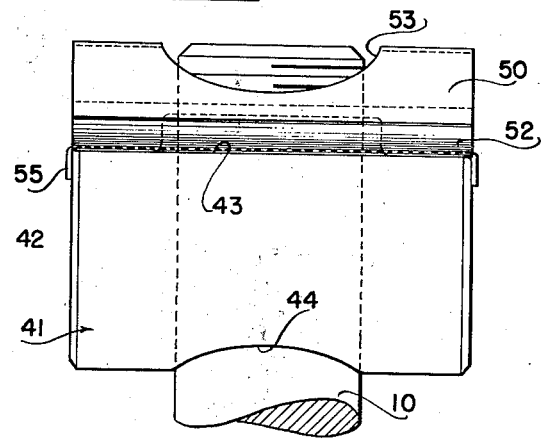
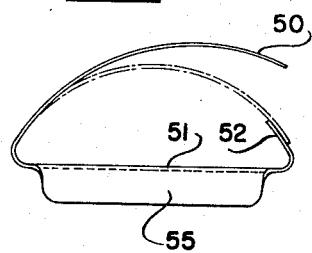
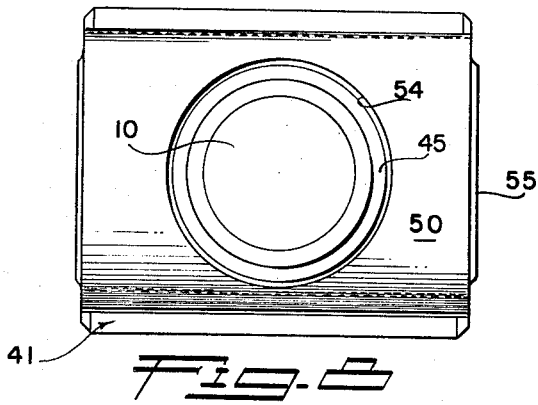
INVENTORS
CARLTON R. DAVENPORT
JUSTI L. MITTLER
By George C. Sullivan
Agent

United States Patent Office 2,903,035
Patented Sept. 8, 1959

2,903,035

BARREL NUT RETAINER HAVING FLEXIBLE RESILIENT OVERLYING WEB

Carlton R. Davenport, North Hollywood, and Justi L. Mittler, Burbank, Calif., assignors to Lockheed Aircraft Corporation, Burbank, Calif.

Application April 15, 1955, Serial No. 501,562

1 Claim. (Cl. 151—41.75)

This invention relates to securing and fastening installations of the bolt and nut type and relates more particularly to barrel nut retainers.

Barrel nuts are employed extensively in aircraft manufacture and in other industries in situations and assemblies where it is either impractical or undesirable to have the nut of a bolt and nut fastening means exposed at a surface of the installation. The barrel nut is inserted in an opening in a part, which opening intersects the bolt hole in such a manner that the nut may be readily inserted in said transverse opening to a position where the bolt may be threaded into the nut. In order to hold the nut in position to receive the bolt it is necessary to employ what is known as a barrel nut retainer. These barrel nut retainers are usually sheet metal devices arranged against the flat side of the nut and adapted to bear or engage in the openings to retain the nut against displacement. The retainers now in use are constructed to engage in the extension of the bolt hole, that is in the portion of the bolt hole at the remote side of the transverse opening. The conventional retainers have raised or protruding portions for fitting in this extension of the bolt hole to locate or index the retainer, and therefore the nut. This means that the inner extremity of the bolt must not interefere with the indexing portion of the retainer when the bolt and nut attachment is completed and tightened down. Because of this, it is necessary to supply bolts varying in length in small increments and to use considerable care in the installation in order to avoid interference resulting from the bolt bottoming on the retainer. Tolerance differentials in the installations or applications often result in such interference which produces full or correct torque indications when the bolt is in fact only partially installed, leaving the connection or attachment loose with the possibility of serious damage to or failure of the completed installation.

An object of this invention is to provide simple, practical and inexpensive barrel nut retainers that avoid or overcome the disadvantages of the retainers now in use.

Another object of this invention is to provide retainers of the character described that do not index or engage in the bolt hole but, on the other hand, leave this opening entirely clear and free so as not to interfere with the bolt, thereby avoiding bottoming of the bolt against the retainer. This prevents false torque indications and, accordingly, insures the proper tightening up of the connection or installation in accordance with applicable specifications and makes it unnecessary to provide bolts varying in length in small increments. These factors not only insure properly assembled and tightened installations but materially facilitate the installation or making up of this form of attachment assembly.

A further object of the invention is to provide a barrel nut retainer that properly positions or locates the nut and dependably retains the same in position by spring action alone and does not require engagement with the bolt hole.

A still further object of the invention is to provide barrel nut retainers that may be readily adapted for use with one piece and floating barrel nuts of various types and makes.

Other objectives and features of the invention will become apparent from the following detailed description of typical preferred forms and embodiments illustrated in the accompanying drawings in which:

Figure 1 is a perspective view of a bolt and barrel nut installation showing a barrel nut retainer of the invention in the operative position with members of the installation appearing in cross section;

Figure 2 is an edge view of the retainer shown in Figure 1 with broken lines illustrating the shape assumed when the retainer is in its operative condition;

Figure 3 is an end or edge elevation of the retainer in position on the barrel nut;

Figure 4 is a side elevation of the bolt, barrel nut and retainer assembly with a portion of the retainer broken away;

Figure 5 is a plan view of the assembly of Figure 4 with a portion of the retainer broken away;

Figure 6 is an end or edge view of another retainer of the invention in the operative position on a bolt and one piece barrel nut assembly;

Figure 7 is a side elevation of the assembly shown in Figure 6;

Figure 8 is a plan view of the assembly illustrated in Figures 6 and 7; and

Figure 9 is an end or edge view of the retainer shown in Figure 6 with broken lines illustrating the operative position of the retainer.

In Figure 1 we have illustrated a typical installation including a bolt 10 and a barrel nut 11. This installation comprises a flange member 12, or the like, having an opening 13 for receiving or passing the bolt 10 and a heavier or thicker member 14 also having an opening 15 for receiving the bolt. The member 14 is further provided with a bore or opening 16 for receiving the barrel nut 11. This opening 16 is transverse of and intersects the bolt hole 15 and has at least one end open and accessible to permit installation or insertion of the nut 11. It will be observed that the bolt hole 15 has what we will term an extension 17 at one side of the transverse opening 16, that is a closed or socket-like portion adapted to receive the inner extremity of the bolt 10. It is to be understood the assembly or installation shown in Figure 1 is merely typical and exemplary and is not to be considered as limiting or restricting the invention in any way.

The barrel nut 11 illustrated is of the floating type, having a body 18 designed to engage or fit in the opening 16 and a shiftable or "floating" part 20 on the body. The nut body 18 has flat parallel ends 21 and a cylindrically curved periphery for bearing in the transverse opening 16. The nut body 18 further has a flat chordal longitudinal face 22 provided with a flat sided channel or groove 23 for receiving the floating part 20. The part 20 is free to "float" or shift in the groove 23 to a limited extent and is internally threaded to receive or mate with the bolt 10. Pins 24 hold the part 20 against displacement from the groove 23. The floating part 20 projects a considerable distance above the chordal face 22 of the nut 11 but of course is proportioned to clear the walls of the transverse opening 16. The drawings merely illustrate one typical form or class of floating barrel nut and are not intended to be limiting or restrictive.

The retainer of the invention illustrated in Figures 1 to 5 inclusive is a one piece member constructed of flexible resilient material and designed to fit and tightly engage between the chordal face or side 22 of the nut 11 and the wall of the transverse opening 16 of the assembly. The retainer may be constructed of sheet stock selected both as to material and thickness so as to assure satisfactory operation under a wide range of temperature and vibration conditions. For example, the retainer may be constructed of spring steel, stainless steel, Phosphorbronze, wire or plastic in thicknesses consistent with the materials employed and the application of the retainers.

The retainer includes a main part or web 26 curved or bowed, as best illustrated in Figures 1, 2 and 3. The web 26 is initially bowed or curved to have a radius of curvature considerably greater than the radius of the transverse opening 16 and the retainer is adapted to be contracted or flexed to the extent that the outside curvature of the web 26 conforms with the wall of the opening 16. The full lines of Figure 2 illustrate the initial configuration of the web 16, that is the shape of the web as manufactured and supplied for use while the broken lines show the web as contracted or flexed to bear in the opening 16. Figures 1 and 3 also show the web 26 as flexed to the operating or active condition where it conforms with and tightly bears against the wall of the opening 16. The main web 26 is provided with a substantially central opening 28 for receiving the bolt 10. It is a feature of the invention that this opening 28 is sufficiently large to freely receive the bolt 10 with no interference or engagement regardless of the position assumed by the floating part 20 of the nut during or after installation. This feature allows the inner portion of the bolt 10 to protrude through the retainer with no interference and, in certain installations and under certain conditions, to extend into extension 17 of the bolt hole. The large or over-sized bolt receiving opening 28 of the retainer web 26 thus makes it possible to employ bolts sufficiently long to take care of a wide range of tolerance variations in the members 12 and 14 of the installation and to use bolts varying considerably in length, with no special care as to such variations, with the assurance there will be no interference with the retainer. The bolt hole extension 17 may be of sufficient depth to receive the inner extremity of the bolt and thus accommodate bolts of greater length than actually required. It is to be observed that the main web 26 of the retainer does not engage in the bolt hole extension 17 and the retainer does not have a boss, or the like, indexed in the extension 17, since such indexing is not required with the retainer of the invention.

Attention is directed to Figures 1 and 3 of the drawings. In Figure 1, it will be seen that the bolt 10 is free to pass into and through the opening 28 with clearance and with no interference whatsoever and in certain instances to protrude into the opening extension 17. In Figure 3 the line X represents the innermost plane or line attainable by the inner extremity of the bolt 10 when using a conventional barrel nut retainer (the retainer shown in Figure 3 being a retainer of this invention). A comparison of Figures 1 and 3 will reveal there is a great deal more leeway when using the retainer of this invention with respect to the location of the end of the bolt 10 than when employing a retainer of the general type now in general use.

The retainer of Figures 1 to 5 inclusive further includes flanges 30 extending inwardly from the circumferential ends of the substantially partially circular web 26. These flanges 30 are flat to flatly bear on the chordal face 22 of the nut 11. In the retainer as initially manufactured and supplied for use the flanges 30 extend downwardly and inwardly from the web 26, as viewed in Figure 2, and as shown in full lines in Figure 2. However, when the retainer is positioned on the nut 11 and the nut and retainer are inserted in the transverse opening 16, the flanges 30 lie in a common plane, as indicated in broken lines in Figure 2, and flatly bear on the face 22 of the nut as shown in Figures 1 and 3. The flanges 30 have their extremities or edges spaced one from the other and these edges are provided with partially circular notches directly opposing one another and together forming what may be termed a space or opening 31 for receiving the protruding portion of the floating nut part 20. This opening 31 is sufficiently large to freely receive the nut part 20 with no interference whatever with the part 20 in any operative position on the bolt 10. As seen in Figure 5, the openings 28 and 31 of the retainer are aligned and concentric. The flanges 30 are further provided with means for holding the retainer in position on the nut 11. An integral tab 32 is provided on each end of each flange 30 and projects substantially at right angles thereto. These tabs 32 engage or cooperate with the ends 21 of the nut 11 to hold the retainer against axial movement or displacement with respect to the nut. The tabs 32 also lend strength and rigidity to the flanges 30.

In employing the retainer illustrated in Figures 1 to 5 inclusive, the retainer is assembled on the barrel nut to have its flanges 30 bear on the chordal face 22 of the nut and to have the tabs 32 engage the ends 21. The assembly of the nut and retainer is then installed in the opening 16, the retainer web 26 being compressed or flexed inwardly with the fingers during this installation or insertion. The nut and retainer assembly is installed to be in a position such as illustrated in Figure 1 of the drawings so that the barrel nut 11 and the openings 28 and 31 are aligned with the bolt hole 13. The bolt 10 is then threaded in place and torqued down in the usual fashion. The oversize openings 28 and 31 of the retainer prevent interference of the bolt or the nut with the retainer and since the bolt 10 is free to continue on through the opening 28 the length of the bolt is not critical so that proper tightening of the bolt may be effected even though the bolt is somewhat longer than required for the particular installation.

Prior to installation of the bolt 10, or after removal of the bolt for inspection, servicing of the installation or the like, the tabs 32 on the retainer hold the retainer against axial displacement. Since the retainer is flexible, resilient and spring-like in character, it readily conforms to the opening 16 and slight inaccuracies in the opening in no way affect the installation. The spring-like retainer obtains and retains firm frictional contact with the walls of the opening 16 to dependably hold the barrel nut against both angular and axial movement or displacement. In fact, the retainer may be constructed to dependably resist the action of heavy vibration and acceleration forces, and deliberately applied force or pressure is necessary to move the retainer and nut assembly. It will be observed that the retainer resembles a partially circular or arcuate spring split or divided axially at or between the spaced flanges 30 and due to this configuration the retainer has extensive pressural and frictional contact with the wall of the opening 16 to hold the barrel nut in place in the opening. A feature of the invention is the ability to intentionally remove the nut and retainer assembly from the opening 16 when this becomes necessary. A deliberate axial pressure or pull will remove the assembly from the opening, even in the case of installations where only one end of the opening is accessible. On the other hand, conventional retainers prevent such removal of the assembly under most circumstances.

In Figures 6 to 9 inclusive, we have shown a retainer of the invention applied to a one-piece barrel nut 41 on a bolt 10, it being understood that the retainer of Figures 1 to 5 inclusive may be used on such a one-piece nut 41 and the retainer of Figures 6 to 9 inclusive may be employed on a floating type nut, such as shown in Figures 1 and 3 to 5 inclusive. The nut 41 is adapted to be installed in the opening 16, having a cylindrical periphery for bearing in the opening. The nut has flat opposite ends 42 and a chordal face 43 corresponding with the above described face 22 of the nut 11. A threaded opening 44 passes through the nut 41 to receive the bolt 10. A raised boss 45 is provided on the flat chordal face 43 around the end of the opening 44.

The retainer of Figures 6 to 9 inclusive is a one piece spring-like part having a curved or bowed main web 50 for bearing on the wall of the opening 16 and a flange 51 for engaging on the face 43 of the nut 41. The web 50 integrally joins and curves upwardly from one longitudinal edge of the flange 51 and in this form of the invention the web 50 is the divided or longitudinally split element having lapped sliding engagement with a longitudinal curved or bowed lip 52 on the other edge of the flange. This is best illustrated in Figure 6. Thus, in the retainer of Figures 1 to 5 inclusive, the flange element is longitudinally divided or split to impart the necessary resiliency to the retainer while in the device of Figures 6 to 9 inclusive, the bowed web 50 is the divided or split element. The main bowed web 50 preferably laps over the lip 52, as indicated by the broken lines in Figure 9 and the full lines in Figure 6, so as to have maximum pressural and frictional engagement with the wall of the opening 16. A substantially central opening 53 is provided in the web 50 to receive the inner extremity of the bolt 10 with clearance and full freedom. Furthermore, in certain installations the opening 53 may receive the boss 45 or crown area of the barrel nut with freedom. In any event the opening 53 is proportioned to offer no interference to either the bolt 10 or the nut 41. As manufactured or fabricated, the web 50 has a radius of curvature considerably greater than the radius of the opening 16, as indicated in full lines in Figure 9, but when flexed inwardly for insertion in the opening 16 the web is brought to a smaller radius condition where it may bear against the lip 51. This provides the web 50 with the inherent resiliency essential to obtain and preserve frictional engagement in the opening 16 to resist unwanted displacement or movement of the barrel nut. The lip 52 in yieldingly restraining the outer margin of the web 50 may impart increased spring action or resiliency to the retainer to assist in the nut retaining function.

The flange 51 is the flat base element of the retainer shown in Figures 6 to 9 inclusive and is designed to flatly bear against the chordal face 43 of the nut 41. A central opening 54 is provided in the flange 51 to receive the boss 45 of the nut 41 with freedom or clearance. As shown in Figure 8, the openings 53 and 54 are aligned and coaxial. The flange 51 is provided with means for holding the retainer against axial displacement relative to the nut 41. Lugs or tabs 55 extend from the opposite ends of the flange 51 to engage or cooperate with the ends 42 of the nut 41. These lugs 55 add rigidity and strength to the flange 51 and overall retainer construction. The retainer of Figures 6 to 9 inclusive may be fabricated from the same materials as the retainers of Figures 1 to 6 inclusive or from any other required or selected materials.

The retainer of Figures 6 to 9 inclusive is employed and operates in substantially the same manner as the retainer of Figures 1 to 5 inclusive. The retainer is first assembled on the nut 41 to have its flange 51 bear on the face 43 and to have its tabs 55 engage the end 42 of the nut. When inserting the assembly in the opening 16 the web 50 is flexed inwardly with the fingers to enter the opening 16 and the assembly is oriented with its openings 53 and 54 aligned with the opening 13 and the opening 15 of the installation. It will be observed that the divided web 50—52 automatically imparts considerable adjustability to the retainer to automatically conform with the opening 16 so that the close tolerances at the openings are not required. The resiliency of the web 50 together with the lip 52 cause the retainer to tightly bind or bear in the opening 16 to resist displacement of the barrel nut even under conditions of high or heavy vibration and acceleration. When the retainer and nut assembly have been properly located at the bolt openings 13 and 15, the bolt 10 may be inserted and threaded in place under the required torque. It should be noted there is absolutely nothing in the nut and retainer assembly to interfere with the bolt so that it is unnecessary to take the care heretofore required in employing bolts of exactly the correct lengths.

Having described only typical forms of the invention we do not wish to be limited to the specific details herein set forth, but wish to reserve to ourselves any variations or modifications that may appear to those skilled in the art and fall within the scope of the following claim.

We claim:

A securing device for use in a cylindrical opening which intersects a bolt receiving bore comprising, in combination; a nut having a substantially cylindrical periphery to engage in said opening, a substantially flat longitudinally extending face in chordal relation to its cylindrical periphery, opposite end surfaces intersecting said flat longitudinally extending face, and a bolt hole terminating at said face adapted to be aligned with said bore; a retainer comprising a unitary flexible resilient sheet material member having a flat flange portion co-extensive with said flat longitudinally extending face of said nut and having a lower surface bearing on said face of said nut, tabs depending from opposite ends of said flange portion and engaging said opposite end surfaces of said nut to prevent relative axial movement between said nut and said retainer, a bowed web extending from one longitudinal margin of said flange portion and curving over the upper surface of said flange portion, said web initially having a radius of curvature greater than the radius of said nut and adapted to be manually flexed into conformance with the opening where its periphery has the same radius of curvature as the periphery of the nut to establish firm movement resisting engagement of the nut and retainer in said opening, a lip extending upwardly from the opposite longitudinal margin of said flange portion, said bowed web and said lip being of respective lengths to extend in lapped engagement when both are disposed along an arc having the same radius of curvature as said nut, said web and said flange having axially aligned openings therethrough disposed in alignment with said bolt hole and of a diameter larger than said bolt hole to freely pass a bolt arranged in said bolt hole.

References Cited in the file of this patent

UNITED STATES PATENTS

| Number | Name | Date |
|---|---|---|
| 167,118 | Pritchett | Aug. 24, 1875 |
| 874,847 | Hulse | Dec. 24, 1907 |
| 1,398,325 | Ivory | Nov. 29, 1921 |
| 2,120,462 | Ferguson | June 14, 1938 |
| 2,144,553 | Simmonds | Jan. 17, 1939 |
| 2,326,285 | Burke | Aug. 10, 1943 |
| 2,391,046 | Tinnerman | Dec. 18, 1945 |
| 2,405,925 | Pouptich | Aug. 13, 1946 |
| 2,767,609 | Cousino | Oct. 23, 1956 |
| 2,809,686 | Shepherd | Oct. 15, 1957 |

FOREIGN PATENTS

| 305,413 | Great Britain | Feb. 7, 1929 |